United States Patent [19]

Lin

[11] Patent Number: 5,190,345

[45] Date of Patent: Mar. 2, 1993

[54] SEAT OF A BICYCLE HAVING A DEVICE FOR FASTENING A BAG

[75] Inventor: Mike Lin, Taichung, Taiwan

[73] Assignee: Topeak Inc., Taiwan, Taiwan

[21] Appl. No.: 802,750

[22] Filed: Dec. 6, 1991

[51] Int. Cl.⁵ .................................................. A47C 7/62
[52] U.S. Cl. ..................................... 297/192; 297/195; 224/39
[58] Field of Search ......... 297/188, 192, 195, DIG. 9; 224/31, 30 R, 33 R, 275, 39, 32 A; 248/95, 229; 280/304.5; 296/37.1, 37.16; 403/87, 206, 293, 294, 82, 188, 390, 391; 24/701, 702

[56] References Cited

U.S. PATENT DOCUMENTS

| | | | |
|---|---|---|---|
| 4,188,145 | 2/1980 | Poling | 24/702 X |
| 4,566,617 | 1/1986 | Jackson | 224/275 |
| 4,577,261 | 3/1986 | Tsuyama | 224/39 X |
| 4,643,343 | 2/1987 | Goldman et al. | 224/275 |
| 5,020,851 | 6/1991 | Chen | 297/195 |
| 5,127,563 | 7/1992 | Chan et al. | 224/30 R |

Primary Examiner—Kenneth J. Dorner
Assistant Examiner—James M. Gardener
Attorney, Agent, or Firm—Poms, Smith, Lande & Rose

[57] ABSTRACT

A seat of a bicycle including a pair of rods disposed on the bottom, a plate disposed above the rods, a bracket disposed below the rods and fixed to the plate so as to fix the rods between the plate and the bracket, the bracket including two flanges formed on the bottom portion, a bag including a member disposed on the upper portion and having a pair of channels for engagement with the flanges of the bracket so that the member can be coupled to the bracket and so that the bag can be coupled to the seat.

2 Claims, 2 Drawing Sheets

SEAT OF A BICYCLE HAVING A DEVICE FOR FASTENING A BAG

BACKGROUND OF THE INVENTION

1. Field of the Invention

The present invention relates to a seat of a bicycle, and more particularly to a seat of a bicycle having a device for fastening a bag.

2. Description of the Prior Art

Typical seats of bicycles are provided as seats only, the users have to carry an additional bag with them for carrying other objects.

The present invention has arisen to provide a seat of a bicycle which has a device for fastening a bag.

SUMMARY OF THE INVENTION

The primary objective of the present invention is to provide a seat of a bicycle which has a device provided for fastening a bag so that objects can be stored and carried in the bag.

In accordance with one aspect of the invention, there is provided a seat of a bicycle including a pair of rods disposed on the bottom, a plate disposed above the rods, a bracket disposed below the rods and fixed to the plate so as to fix the rods between the plate and the bracket, the bracket including two flanges formed on the bottom portion, a bag including a member disposed on the upper portion and having a pair of channels for engagement with the flanges of the bracket so that the member can be coupled to the bracket and so that the bag can be coupled to the seat.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
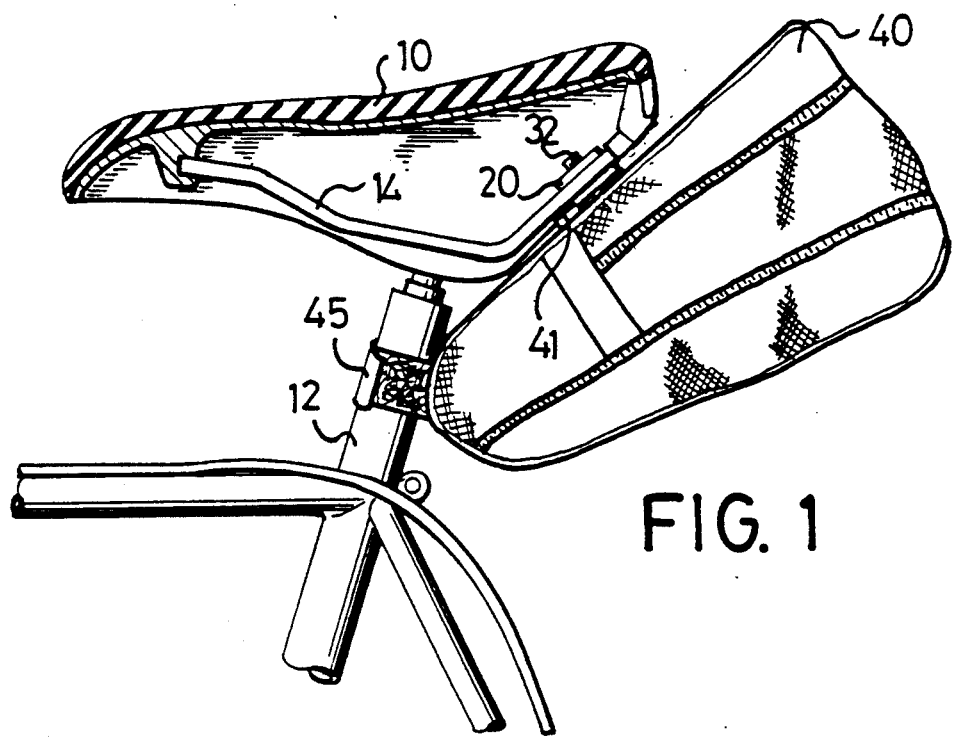
FIG. 1 is a partial cross sectional view of a seat of a bicycle in accordance with the present invention.
Figure 3:
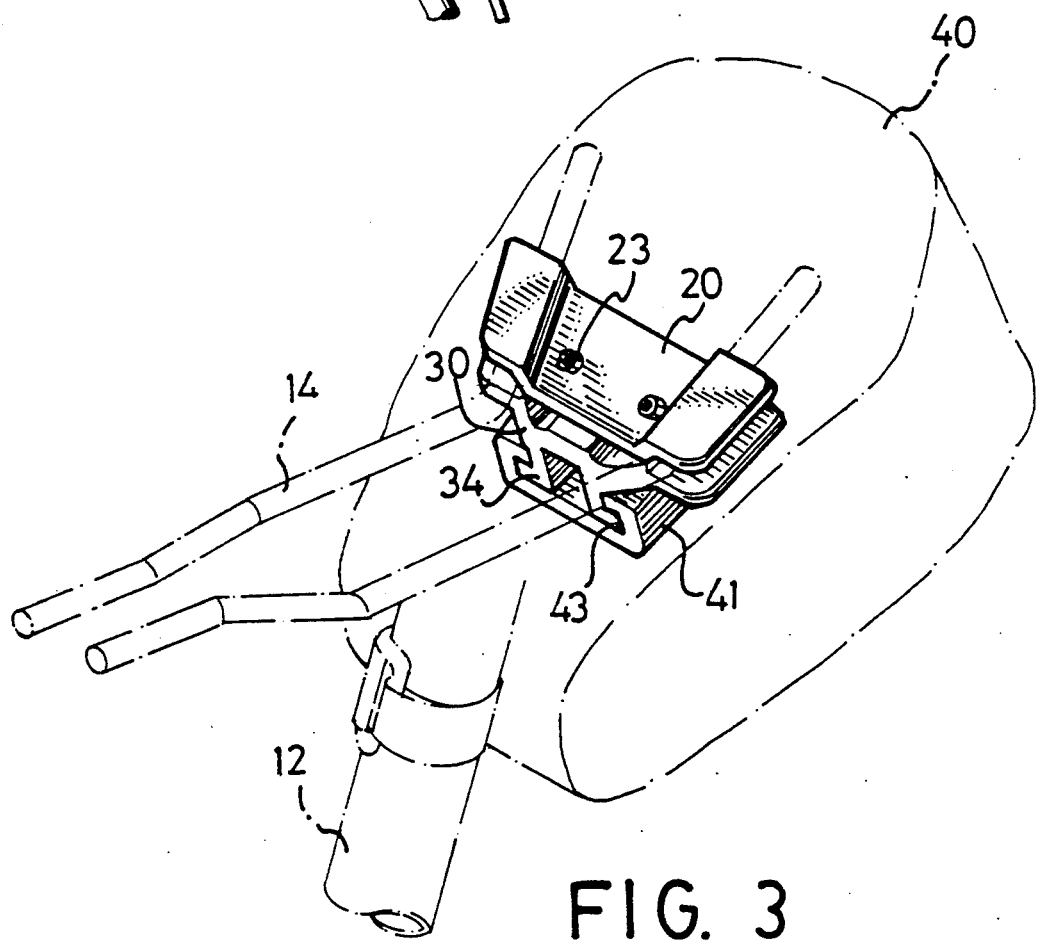
FIG. 3 is a perspective view of the device for fastening the bag.
Figure 2:
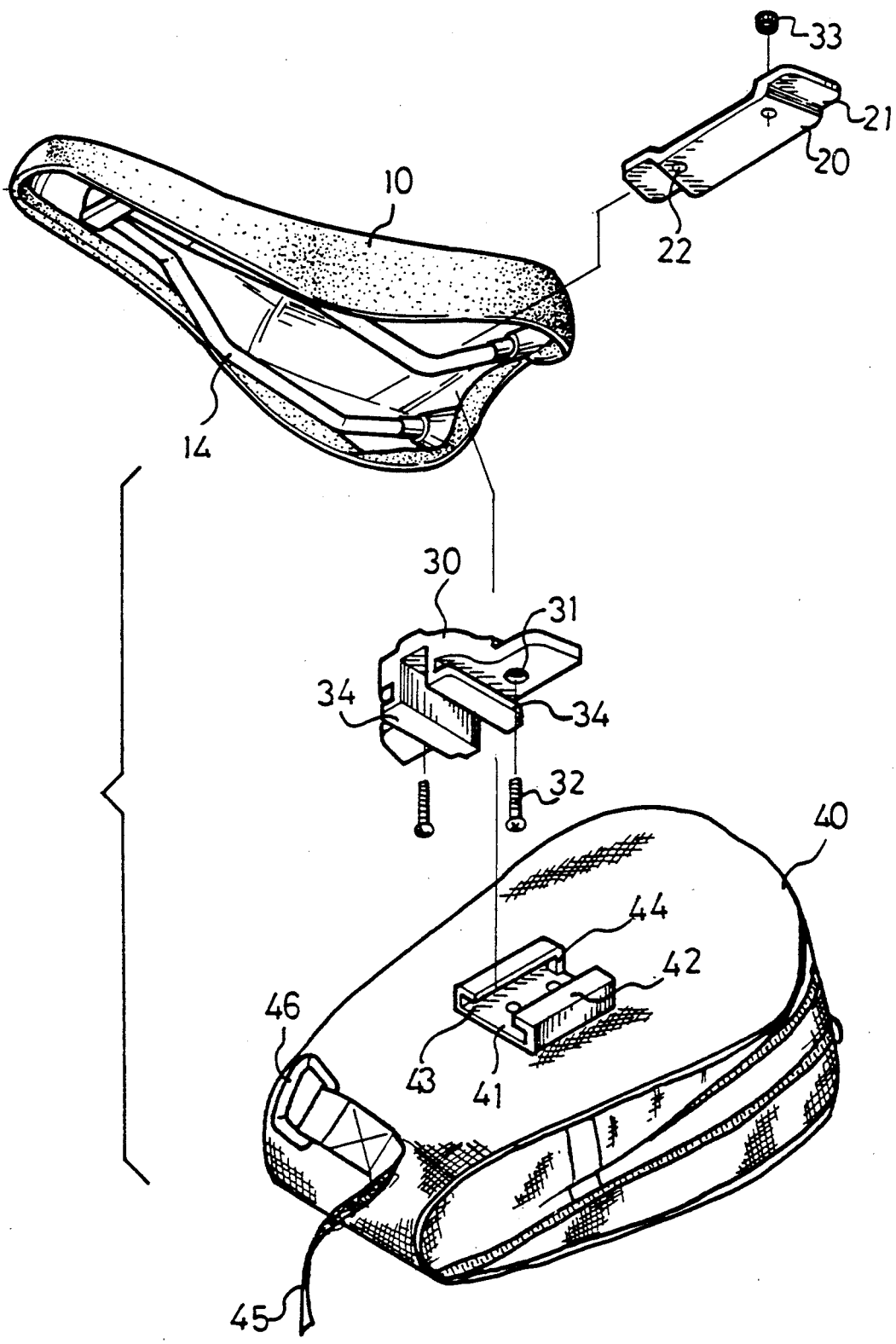
FIG. 2 is an exploded view of the seat.

Referring to the drawings, a seat of a bicycle 10 in accordance with the present invention is fixed on a seat post 12 of the bicycle and comprises a pair of rods 14 provided on the lower portion thereof. A plate 20 is disposed above the rods 14 and includes a shoulder 21 formed in each of the two end portions for engagement on the rods 14 and includes two holes 22 formed therein. A bracket 30 is disposed below the rods 14 includes two holes 31 formed therein. Two bolts 32 engage through the holes 31, 22 and threadedly engage with nuts 33 so as to fix the rods 14 between the bracket 30 and the plate 20. The bracket 30 includes two flanges 34 formed on the bottom portion thereof and laterally extended outward therefrom.

The bag 40 includes a member 41 fixed on the upper portion thereof. The member 41 includes two flanges 42 laterally extended inward so as to form a pair of channels 43 for engagement, such as force-fitted engagement, with the flanges 34 of the bracket 30 so that the member 41 and the bag 40 can be coupled to the seat 10. One end of each of the channels 43 includes an end wall 44 formed integral with the respective flange 42 so as to limit the movement of the flanges 34 of the bracket 30 in the channels 43, so that the member 41 can be stably coupled to the bracket 30. The bag 40 further, includes a "VELCRO" strip 45, or hook and loop strip, and a ring 46 through which the strip 45 passes so that the strip 45 can be coupled to the seat post 12 of the bicycle, and so that the bag 40 can further be retained in place.

Accordingly, bags can be easily coupled to the seat of the bicycle in accordance with the present invention by the fastening device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A seat of a bicycle comprising:
   a pair of rods provided on a bottom portion thereof;
   a plate disposed above said rods and having two end portions each having a shoulder formed thereon for engagement with said rods respectively so that said plate is stably engaged with said rods;
   a bracket disposed below said rods and fixed to said plate so that said rods are fixed between said plate and said bracket, said bracket having two first flanges formed on a bottom portion thereof and laterally extended outward therefrom;
   an object having a member disposed on an upper portion thereof, said member having a pair of second flanges extended inward therefrom so as to form a pair of channels for engagement with said first flanges of said bracket in order to couple said member to said bracket and in order to couple said object to said seat, and each of said channels having an end wall formed integral on a first end thereof for limiting relative movement between said bracket and said member.

2. A seat of a bicycle attachable to a seat post, said seat comprising:
   a pair of rods provided on a bottom portion thereof;
   a plate disposed above said rods and having two end portions each having a shoulder formed thereon for engagement with said rods respectively so that said plate is stably engaged with said rods;
   a bracket disposed below said rods and fixed to said plate so that said rods are fixed between said plate and said bracket, said bracket having two first flanges formed on a bottom portion thereof and laterally extended outward therefrom;
   an object having a member disposed on an upper portion thereof, said member having a pair of second flanges extended inward therefrom so as to form a pair of channels for engagement with said first flanges of said bracket in order to couple said member to said bracket and in order to couple said object to said seat, and each of said channels having an end wall formed integral on a first end thereof for limiting relative movement between said bracket and said member, said object also having a hook and loop strip and a ring disposed on said object such that said hook and loop strip can pass through said ring and such that said hook and loop strip and said ring can be used to secure said object to said seat post of said bicycle.

* * * * *